US012518631B2

(12) United States Patent
Yan et al.

(10) Patent No.: US 12,518,631 B2
(45) Date of Patent: Jan. 6, 2026

(54) VEHICLE SCHEDULING METHOD, ELECTRONIC EQUIPMENT AND STORAGE MEDIUM

(71) Applicant: Beijing Baidu Netcom Science Technology Co., Ltd., Beijing (CN)

(72) Inventors: Jingang Yan, Beijing (CN); Yudong Jiang, Beijing (CN); Jianhua Wu, Beijing (CN); Pengfei Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 275 days.

(21) Appl. No.: 18/088,409

(22) Filed: Dec. 23, 2022

(65) Prior Publication Data

US 2023/0206765 A1 Jun. 29, 2023

(30) Foreign Application Priority Data

Dec. 28, 2021 (CN) .......................... 202111624514.0

(51) Int. Cl.
*G08G 1/16* (2006.01)
*G08G 1/09* (2006.01)

(52) U.S. Cl.
CPC ............. *G08G 1/166* (2013.01); *G08G 1/091* (2013.01); *G08G 1/162* (2013.01)

(58) Field of Classification Search
CPC ........ G08G 1/166; G08G 1/091; G08G 1/162; G08G 1/164; G06Q 10/0631; G06Q 50/10;

(Continued)

(56) References Cited

U.S. PATENT DOCUMENTS 10,573,178 B2* 2/2020 Nascimento ............ H04L 67/12
2014/0278029 A1* 9/2014 Tonguz .................. G08G 1/161
701/117

(Continued)

FOREIGN PATENT DOCUMENTS

CN 103794079 A 5/2014
CN 107844886 A 3/2018
(Continued)

OTHER PUBLICATIONS

Jan. 9, 2024—CN Fourth Office Action—App. No. 2021116245140.
(Continued)

*Primary Examiner* — Anne Marie Antonucci
*Assistant Examiner* — Jewel A Kuntz
(74) *Attorney, Agent, or Firm* — Banner & Witcoff, Ltd.

(57) ABSTRACT

Provided are a vehicle scheduling method, an electronic equipment and a storage medium, relating to the technical field of artificial intelligence, in particular to, the fields of Internet of Things, autonomous parking, automatic driving and the like. The vehicle scheduling method includes: reporting, by a first vehicle, based on a first broadcast channel, a first vehicle state; receiving, by the first vehicle, a second vehicle state reported by a second vehicle based on the first broadcast channel, the second vehicle being a vehicle other than the first vehicle in the same parking lot; and obtaining, by the first vehicle, a scheduling decision result for avoidance between the first vehicle and the second vehicle, according to the first vehicle state and the second vehicle state.

9 Claims, 3 Drawing Sheets

(58) Field of Classification Search
CPC .......................... G06Q 50/40; B60Y 2300/06; B60Y 2300/08; B60Y 2400/90
See application file for complete search history.

(56) References Cited

U.S. PATENT DOCUMENTS

| | | |
|---|---|---|
| 2019/0239040 A1 | 8/2019 | Va et al. |
| 2021/0245758 A1 | 8/2021 | Ahmad et al. |

FOREIGN PATENT DOCUMENTS

| | | | | |
|---|---|---|---|---|
| CN | 110109458 | A | | 8/2019 |
| CN | 110415543 | A | | 11/2019 |
| CN | 112419771 | A | | 2/2021 |
| CN | 113223323 | A | | 8/2021 |
| CN | 113492842 | A | | 10/2021 |
| CN | 113744524 | A | | 12/2021 |
| JP | 2003281697 | A | * | 10/2003 |
| JP | 201891776 | A | | 6/2018 |
| JP | 201955748 | A | | 4/2019 |
| JP | 2019164698 | A | | 9/2019 |
| JP | 2019207465 | A | | 12/2019 |
| JP | 2019214292 | A | * | 12/2019 |
| KR | 20200068621 | A | | 6/2020 |

OTHER PUBLICATIONS

Mar. 19, 2024—CN Notification of grant of patent right for invention—App. No. 2021116245140.
Jan. 26, 2024—JP—Notice of Reasons for Refusal—App. No. 2022-209205.
May 31, 2023—(EP) European Extended Search Report—App. No. 22216379.2.
May 27, 2023—(CN) First Office Action and Search Report—App. No. 2021116245140.0.
Aug. 2, 2023—(CN) Second Office Action—App. No. 2021116245140.0.
Oct. 16, 2023—(CN) Third Office Action and Search Report—App. No. 2021116245140.0.
KR10-2022-0184451 Notice of Preliminary Rejection and Translation dated Jan. 31, 2025.

* cited by examiner

VEHICLE SCHEDULING METHOD, ELECTRONIC EQUIPMENT AND STORAGE MEDIUM

CROSS-REFERENCE TO RELATED APPLICATIONS

The present application claims the priority from Chinese Patent Application No. 202111624514.0, filed with the Chinese Patent Office on Dec. 28, 2021, the content of which is hereby incorporated herein by reference in its entirety.

TECHNICAL FIELD

The present disclosure relates to a technical field of artificial intelligence, in particular, to fields of Internet of Things, autonomous parking, automatic driving and the like.

BACKGROUND

With development of technology, performance optimization of software/hardware may be realized through artificial intelligence, which is applicable to a variety of application scenarios, for example, an artificial intelligence technology may be used in a software/hardware design of application scenarios such as autonomous parking, automatic driving and the like, so as to improve processing speed and processing accuracy of the software/hardware.

However, taking the autonomous parking as an example, when a large number of vehicles are parked in a parking lot and there are parking or leaving at the same time, if it is not handled properly, it is easy to collide between the vehicles, thus it is necessary to schedule between the vehicles. Whether the scheduling accuracy or not will affect the processing speed and the processing accuracy of the software/hardware, such as the scheduling accuracy will affect accuracy of the autonomous parking, thereby reducing traffic efficiency.

SUMMARY

The present disclosure provides a vehicle scheduling method and device, an electronic equipment and a storage medium.

According to one aspect of the present disclosure, provided is a vehicle scheduling method, including: reporting, by a first vehicle, based on a first broadcast channel, a first vehicle state; receiving, by the first vehicle, a second vehicle state reported by a second vehicle based on the first broadcast channel, the second vehicle being a vehicle other than the first vehicle in a same parking lot; and obtaining, by the first vehicle, a scheduling decision result for avoidance between the first vehicle and the second vehicle, according to the first vehicle state and the second vehicle state.

According to another aspect of the present disclosure, provided is a vehicle scheduling device, including: a reporting unit configured to cause a first vehicle to report, based on a first broadcast channel, a first vehicle state; a receiving unit configured to cause the first vehicle to receive a second vehicle state reported by a second vehicle based on the first broadcast channel, the second vehicle being a vehicle other than the first vehicle in a same parking lot; and a scheduling decision unit configured to cause the first vehicle to obtain a scheduling decision result for avoidance between the first vehicle and the second vehicle, according to the first vehicle state and the second vehicle state.

According to another aspect of the present disclosure, provided is an electronic equipment, including: at least one processor; and a memory communicatively connected to the at least one processor. The memory stores an instruction executable by the at least one processor, and the instruction is executed by the at least one processor to cause the at least one processor to execute any one of the methods provided by embodiments of the present disclosure.

According to another aspect of the present disclosure, provided is a non-transitory computer-readable storage medium storing a computer instruction, and the computer instruction is used to cause a computer to execute any one of the methods provided by embodiments of the present disclosure.

According to another aspect of the present disclosure, provided is a computer program product including a computer program, and the computer program implements any one of the methods provided by embodiments of the present disclosure when executed by a processor.

By adopting the present disclosure, a first vehicle may report, based on a first broadcast channel, a first vehicle state, and receive a second vehicle state reported by a second vehicle based on the first broadcast channel, the second vehicle being a vehicle other than the first vehicle in the same parking lot. The first vehicle may obtain a scheduling decision result for avoidance between the first vehicle and the second vehicle, according to the first vehicle state and the second vehicle state, so as to perform an avoidance operation according to the scheduling decision result, thereby improving traffic efficiency.

It should be understood that the contents described in this part are not intended to identify key or important features of embodiments of the present disclosure, nor is it used to limit the scope of the present disclosure. Other features of the present disclosure will be easily understood by the following description.

BRIEF DESCRIPTION OF THE DRAWINGS

The accompanying drawings are used to better understand the present solution, and do not constitute a limitation to the present disclosure.

DETAILED DESCRIPTION

The following description describes exemplary embodiments of the present disclosure with reference to the accompanying drawings, include various details of the embodiments of the present disclosure to facilitate understanding, and should be considered as merely exemplary. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

The term "and/or" herein only describes an association relation of associated objects, which indicates that there may be three kinds of relations, for example, A and/or B may indicate that there is only A exists, there are both A and B, and there is only B. The term "at least one" herein indicates any one of many items or any combination of at least two of many items, for example, at least one of A, B, and C may indicate any one or more elements selected from a set of A, B, and C. The term "first" and "second" herein indicates a plurality of similar technical terms and uses to distinguish them from each other, but does not limit an order of them or limit that there are only two items, for example, a first feature and a second feature indicate two types of features/two features, a quantity of the first feature may be one or more and a quantity of the second feature may also be one or more.

In addition, in order to better illustrate the present disclosure, numerous specific details are given in the following detailed description. Those of ordinary skill in the art should be understood that the present disclosure may be performed without certain specific details. In some examples, methods, means, elements and circuits well known to those skilled in the art are not described in detail in order to highlight the subject matter of the present disclosure.

Figure 1:
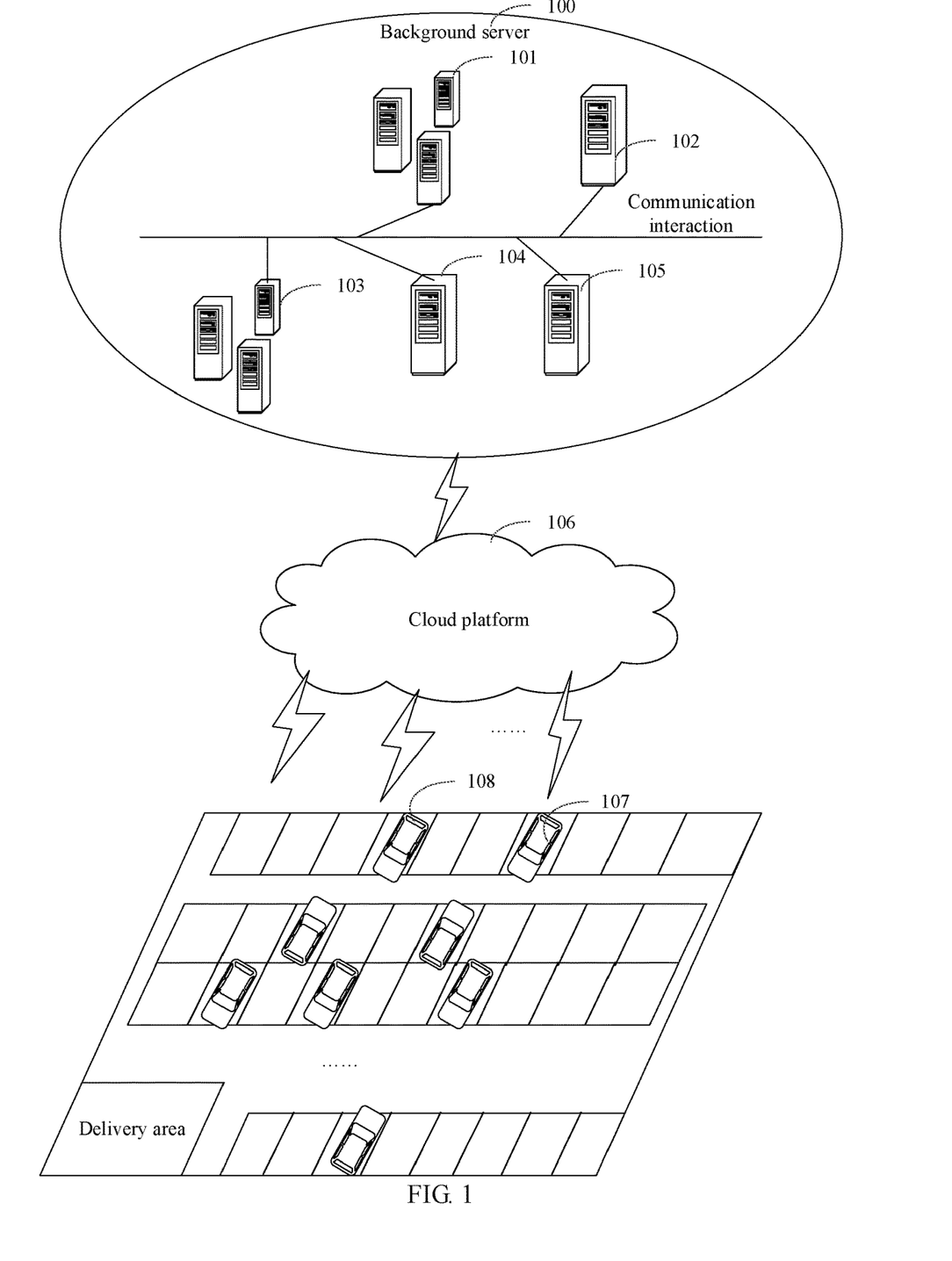
FIG. 1 is a schematic diagram of an application scenario of communication between vehicles and a cloud platform according to embodiments of the present disclosure.

According to embodiments of the present disclosure, FIG. 1 is a schematic diagram of an application scenario of communication between vehicles and a cloud platform according to embodiments of the present disclosure, which includes a background server 100, a plurality of vehicles (identified by taking vehicle 107 to vehicle 108 as an example) located in the same parking lot, and a "cloud platform" 106 for communication between the background server and the plurality of vehicles. A distributed cluster system may be adopted on a side of the background server, and it is exemplarily described that the distributed cluster system may be used for unified vehicle scheduling (or auxiliary vehicle scheduling) based on data reported by the plurality of vehicles. The auxiliary vehicle scheduling means that the background server only collects the data for subsequent update and maintenance, so as to obtain a more accurate arbitration decision based on the data obtained from the update and maintenance. A main arbitration decision is realized through communication established between the plurality of vehicles based on a broadcast channel. All the vehicles may also be scheduled in the background server, that is, vehicle states of all the vehicles obtained based on the broadcast channel are distributed to the vehicles after the background server makes a unified arbitration decision, so that the vehicles may independently choose the user behaviors (such as turning to avoid a vehicle, waiting in place, avoiding a straightly driving vehicle or a turning vehicle, and the like) they want to perform according to the arbitration decision. As shown in FIG. 1, the distributed cluster system includes multiple nodes (such as a server cluster 101, a server 102, a server cluster 103, a server 104 and a server 105). Taking the unified vehicle scheduling as an example, the multiple nodes may jointly perform one or more vehicle scheduling tasks. Alternatively, the multiple nodes in the distributed cluster system may execute the vehicle scheduling tasks based on a whole process of vehicle scheduling, and the multiple nodes may also execute a part of the process of vehicle scheduling respectively, and jointly execute the vehicle scheduling task in a cooperative manner. Alternatively, data exchange (such as data synchronization) may be performed between the multiple nodes after each vehicle scheduling task is completed.

Figure 2:
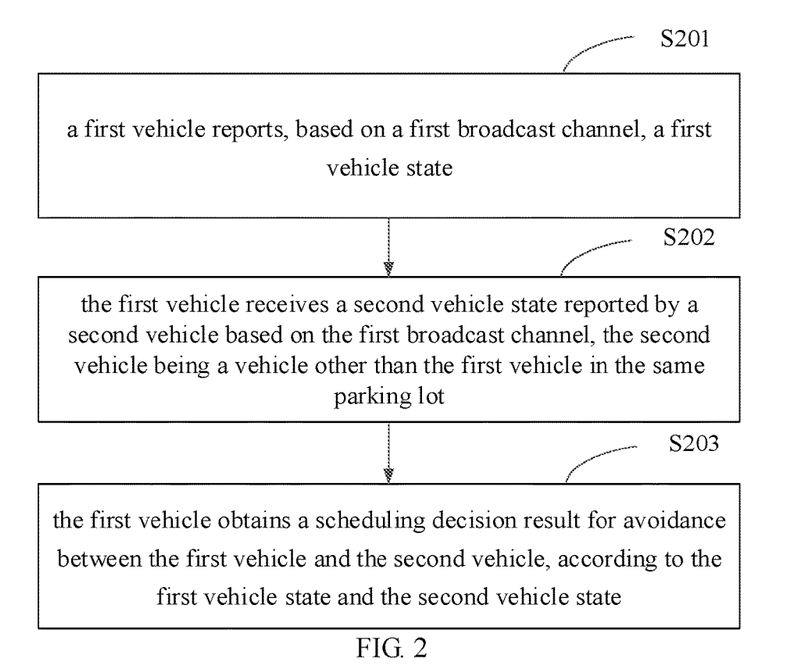
FIG. 2 is a flowchart of a vehicle scheduling method according to embodiments of the present disclosure.

According to embodiments of the present disclosure, a vehicle scheduling method is provided. FIG. 2 is a flow diagram of the vehicle scheduling method according to embodiments of the present disclosure. The method may be applied to a vehicle scheduling device, for example, when the device may be deployed on a terminal, a server or other processing equipment in a single machine system, a multi-machines system or a cluster system, the vehicle scheduling and other processing may be realized. The terminal may be a user equipment (UE), a mobile device, a personal digital assistant (PDA), a handheld device, a computing device, an on-vehicle device, a wearable device, and the like. In some possible implementations, the method may also be implemented by manner of invoking a computer-readable instruction stored in memory by a processor. As shown in FIG. 2, the method includes the followings.

In S201, a first vehicle reports, based on a first broadcast channel, a first vehicle state.

In S202, the first vehicle receives a second vehicle state reported by a second vehicle based on the first broadcast channel, the second vehicle being a vehicle other than the first vehicle in the same parking lot.

In S203, the first vehicle obtains a scheduling decision result for avoidance between the first vehicle and the second vehicle, according to the first vehicle state and the second vehicle state.

In an example of S201 to S203, the first vehicle and the second vehicle are located in the same parking lot, and the first vehicle and the second vehicle may establish communication through the same broadcast channel, i.e., both the first vehicle and the second vehicle may access the first broadcast channel and report their respective vehicle states through the first broadcast channel, the first vehicle reports the first vehicle state through the first broadcast channel, and the second vehicle reports the second vehicle state through the first broadcast channel, so that each other may know the other's state. When the first vehicle receives the second vehicle state through the first broadcast channel, the first vehicle may make a decision by combining the first vehicle state and the second vehicle state to obtain the scheduling decision result for the avoidance between the first vehicle and the second vehicle.

By adopting embodiments of the present disclosure, since the first vehicle may report the first vehicle state through the first broadcast channel and receive the second vehicle state reported by the second vehicle based on the first broadcast channel, the first vehicle may combine the first vehicle state and the second vehicle state to obtain the scheduling decision result for the avoidance between the first vehicle and the second vehicle, so as to perform an avoidance operation (such as turning to avoid a vehicle, waiting in place, avoiding a straightly driving vehicle or a turning vehicles, and the like) according to the scheduling decision result, thereby improving traffic efficiency.

In one implementation, that the first vehicle reports the first vehicle state through the first broadcast channel includes that the first vehicle accesses, according to a parking lot identification of the same parking lot, the first broadcast channel corresponding to the parking lot identification, the first vehicle sends a broadcast message through the first broadcast channel corresponding to the parking lot identification, the broadcast message carries the first vehicle state. By adopting the implementation, there is an one-to-one mapping relationship between the parking lot identification and the broadcast channel, so that the first vehicle and the second vehicle may be ensured to access a unique broadcast channel according to the parking lot identification, the communication established between the first vehicle and the second vehicle based on the broadcast channel is reliable, and the vehicle states between each other obtained through the broadcast channel is accurate, thereby improving accuracy of a scheduling decision.

In one implementation, obtaining, by the first vehicle, the scheduling decision result for the avoidance between the first vehicle and the second vehicle, according to the first vehicle state and the second vehicle state includes that: the first vehicle obtains, according to the first vehicle state and the second vehicle state, the scheduling decision result, by actively changing the first vehicle's own behavior, and sends the scheduling decision result to the second vehicle through the first broadcast channel. By adopting the implementation, the first vehicle may actively change its original strategy and send the scheduling decision result obtained by such manner to the second vehicle through the first broadcast channel. A relationship between the vehicles is negotiable, i.e., the scheduling decision may be made directly by the vehicle itself, which is more efficient.

In one implementation, obtaining, by the first vehicle, the scheduling decision result for the avoidance between the first vehicle and the second vehicle, according to the first vehicle state and the second vehicle state includes that: the first vehicle continues maintaining, according to the first vehicle state and the second vehicle state, the first vehicle's own behavior; generates a notification message; sends, based on the first broadcast channel, the notification message to the second vehicle; the first vehicle monitors, based on the first broadcast channel, feedback of the second vehicle; and in the case where the second vehicle obtains the scheduling decision result by actively changing the second vehicle's own behavior based on the notification message, the first vehicle receives, based on the first broadcast channel, the scheduling decision result. By adopting the implementation, the first vehicle may not change its original strategy and notify the second vehicle, and then the second vehicle makes the change and feeds back the resulting scheduling decision result obtained by such manner to the first vehicle, the first vehicle monitors the scheduling decision result and continues maintaining the first vehicle's own behavior after learning the change of the second vehicle. The relationship between vehicles is also negotiable, and the scheduling decision may also be made directly by the vehicle itself, which is more efficient.

In one implementation, obtaining, by the first vehicle, the scheduling decision result for the avoidance between the first vehicle and the second vehicle, according to the first vehicle state and the second vehicle state includes that: the first vehicle continues maintaining, according to the first vehicle state and the second vehicle state, the first vehicle's own behavior; generates a notification message; sends, based on the first broadcast channel, the notification message to the second vehicle; and in the case where the second vehicle continues maintaining the second vehicle's own behavior based on the notification message and the second vehicle's own behavior conflicts with the first vehicle's own behavior, the first vehicle receives, based on the first broadcast channel, the scheduling decision result made by a cloud platform. The scheduling decision result made by the cloud platform is obtained according to a priority of the first and second vehicles in a current conflict scene. By adopting the implementation, the cloud platform operates according to scheduling decision priorities (which may be a preset priority rule) of the first vehicle and the second vehicle in the current conflict scene, and a vehicle with a high priority takes precedence over a vehicle with a low priority. That is, if the first vehicle has the high priority in the current conflict scenario according to the priority rule, it is more necessary to give priority to the first vehicle's own behavior, then, the first vehicle maintains its own user behavior, and the cloud platform notifies the second vehicle to make changes. The relationship between vehicles is non-negotiable, so the cloud platform makes the scheduling decision, thereby avoiding congestion or other more worse traffic accidents caused by a decision-making stalemate between the vehicles.

In some examples, for example, the first broadcast message sent by the first vehicle is: the first vehicle is about to go down from a B1 floor to an exit of a B2 cross floor of the parking lot, and at this time, a second broadcast message sent by the second vehicle is: the second vehicle is about to pass through the exit of the B2 cross floor. Considering a narrow passage connecting the cross floor between two floors of the parking lot, and situations on both sides of the exit of the B2 cross floor cannot be seen before the head of the first vehicle drives out of the passage, and if the vehicles cannot avoid in time, a traffic accident such as congestion or collision will be caused. When the vehicles may negotiate with each other, if the second vehicle monitors the first broadcast message sent by the first vehicle and changes its original strategy (the original strategy is continuing to drive to the exit of the B2 cross floor, and accordingly, the changed original strategy is stopping to avoid the first vehicle safely), the first vehicle monitors a third broadcast message "the second vehicle changes its original strategy" sent by the second vehicle, and a decision is agreed, i.e., the scheduling decision result monitored by the first vehicle is that the second vehicle changes its original strategy, and the first vehicle continues maintaining the its own behavior, which is driving from the B1 floor to the exit of the B2 cross floor of the parking lot, after learning the change of the second vehicle. When the vehicles cannot negotiate with each other, that is, the first vehicle and the second vehicle both make a decision to "go first" or "yield to the other party for safe avoidance" before approaching a safe distance, the decisions are reported to or actively detected by the cloud platform, then the cloud platform makes the scheduling decision, determines which vehicle needs to go first and which vehicle needs to avoid for safety according to the scheduling decision priorities in the current conflict scene, and broadcasts the scheduling decision result made by the cloud platform to the first vehicle and the second vehicle, the first vehicle and the second vehicle may execute according to the scheduling decision result.

In one implementation, the first vehicle state includes information for characterizing a basic state of the first vehicle, surrounding environment information capable of being perceived by the first vehicle, and a behavior which the first vehicle intends to perform, the second vehicle state includes information for characterizing a basic state of the second vehicle, surrounding environment information capable of being perceived by the second vehicle, and a behavior which the second vehicle intends to perform. By adopting the implementation, the first vehicle state and the second vehicle state may be obtained between the vehicles through the first broadcast channel, so as to provide data support for a subsequent decision.

In one implementation, the method further includes that the first vehicle initiates an authentication request message to request the cloud platform to provide a broadcast service for the first broadcast channel, and the first vehicle uses the broadcast service after authorization, in the case where the first vehicle receives an authentication success response message. By adopting the implementation, in consideration of security, a legal identity of a vehicle may be verified between the first vehicle, the second vehicle and the background server in the cloud platform through authentication (including initiating the authentication request message and receiving the authentication success response message). The vehicle will download a security certificate in advance, carry the security certificate in the authentication request message and send it, and after receiving the authentication success response message and the authentication is legal, the broadcast service may be authorized to be used.

According to embodiments of the present disclosure, a vehicle scheduling method is provided, the method includes that a plurality of vehicles in the same parking lot establish communication among the plurality of vehicles through the same broadcast channel and report their respective vehicle states, the plurality of vehicles arbitrate according to their respective vehicle states to achieve a common decision and obtain a scheduling decision result for avoidance among the plurality of vehicles, and the plurality of vehicles execute an avoidance operation according to the scheduling decision result. By adopting the present disclosure, the plurality of vehicles in the same parking lot may establish the communication among the plurality of vehicles through the same broadcast channel and report their respective vehicle states, and the plurality of vehicles may make the common decision according to their respective vehicle states to obtain the scheduling decision result for the avoidance among the plurality of vehicles. The plurality of vehicles perform the avoidance operation according to the scheduling decision result, so as to improve the traffic efficiency, avoid congestion, and avoid a potential safety hazard which may be caused by collision among the vehicles.

In one example, the plurality of vehicles in the same parking lot establish the communication among the plurality of vehicles through the same broadcast channel (i.e., the broadcast channel corresponding to the parking lot identification), the parking lot identification may be a unified identification of the same parking lot, for example, the parking lot identification of "a parking lot A" may be "a parking lot ID (A)", the parking lot identification may also be an identification corresponding to any floor of the same parking lot, for example, "a parking lot B" includes three underground floors, namely $B_1$, $B_2$ and $B_3$, and the parking lot identifications corresponding to each floor of "the parking lot B" may be: "a parking lot ID ($B_1$), a parking lot ID ($B_2$) and a parking lot ID ($B_3$)", respectively. After locking the corresponding broadcast channel according to the corresponding parking lot identification, the plurality of vehicles may access the broadcast channel (for example, the plurality of vehicles send broadcast messages carrying their respective vehicle states based on the broadcast channel), and the plurality of vehicles make the common decision according to their respective vehicle states to obtain the scheduling decision result for the avoidance among the plurality of vehicles, so as to perform the avoidance operation according to the scheduling decision result (such as turning to avoid a vehicle, waiting in place, avoiding a straightly driving vehicle or a turning vehicle, etc.).

In one implementation, establishing the communication among the plurality of vehicles through the same broadcast channel and reporting their respective vehicle states by the plurality of vehicles in the same parking lot includes that the plurality of vehicles access the broadcast channel corresponding to the parking lot identification according to the parking lot identification of the same parking lot, in other words, there is a mapping relationship between the parking lot identification and the broadcast channel, which is one-to-one corresponding, and the mapping relationship may be in a form of a mapping table. The plurality of vehicles send broadcast messages through the broadcast channel corresponding to the parking lot identification (the broadcast messages may carry the respective vehicle states reported by the plurality of vehicles). By adopting the implementation, there is the one-to-one mapping relationship between the parking lot identification and the broadcast channel, so that the plurality of vehicles may be ensured to access the unique broadcast channel according to the parking lot identification, the communication established among the plurality of vehicles based on the broadcast channel is reliable, the vehicle states among the plurality of vehicles obtained through the broadcast channel are accurate, and accuracy of a subsequent arbitration decision is improved.

In one implementation, the respective vehicle states include a first state for characterizing information of a vehicle itself and a second state for characterizing information of other vehicles except for the vehicle. By adopting the implementation, not only the vehicle state of the vehicle itself (i.e., the first state) is included, but also the vehicle state of the other vehicles except the vehicle (i.e. the second state) is included, thus data integrity of state data is high, a vehicle of the plurality of vehicles learns itself and other vehicles, the state data is much more comprehensive, and a subsequent arbitration based on the state data may improve the accuracy of the subsequent arbitration decision.

In one implementation, the respective vehicle states also include: the surrounding environment information perceived by each of the plurality of vehicles, and the user behavior each vehicle wants to perform. By adopting the implementation, not only the data integrity is high, but also perception information of each vehicle (for example, each vehicle may perceive an obstacle around it) and the user behavior of each vehicle (a current intention of each vehicle wants to execute is an intention such as turning to avoid, moving, waiting in place, and the like) may be included. In addition to the state data of each vehicle, other types of data are added and integrated into the respective vehicle states, which provides multi-angle data types for the subsequent arbitration, and improves the accuracy of the subsequent arbitration decision.

In one implementation, make the common decision, by the plurality of vehicles, according to the respective vehicle states to obtain the scheduling decision result for the avoidance among the plurality of vehicles includes that the plurality of vehicles make a pre-judgment according to their respective vehicle states before untimely avoidance of the plurality of vehicles occurs, obtain an arbitration result under mutual influences of the user behaviors to be performed by the plurality of vehicles, make the common decision according to the arbitration result to obtain the scheduling decision result for the avoidance among the plurality of vehicles. By adopting the implementation, the pre-judgment is made before the untimely avoidance occurs, the arbitration result is obtained through an arbitration mechanism (i.e., the arbitration result under the mutual influence of the user behaviors to be performed by the vehicles), the common decision is made according to the arbitration result, and the scheduling decision result for the avoidance among the plurality of vehicles is obtained (for example, if one of two vehicles wants to drive out of a parking space, and another vehicle wants to drive into an adjacent parking space at a very close position to the vehicle, if the avoidance is untimely, congestion or collision is likely to occur, then the arbitration mechanism will make the scheduling decision that whether the vehicle will drive out first or wait in place and let the other party drive in first), instead of judging after the congestion or collision occurs. Judging after the congestion or collision occurs is actually unable to effectively schedule the plurality of vehicles.

In one implementation, the method further includes that the plurality of vehicles initiate authentication request messages to request the cloud platform to provide a broadcast service for the broadcast channel, and the plurality of vehicles are authorized to use the broadcast service when receiving authentication success response messages. By adopting the implementation, in consideration of security, the legal identities of the vehicles may be verified between the plurality of vehicles and the background server in the cloud platform through authentications (including initiating the authentication request messages and receiving the authentication success response messages). The vehicles will download security certificates in advance, carry the security certificates in the authentication request messages and send them, and after receiving the authentication success response messages and the authentications are legal, the broadcast service may be authorized to be used.

The vehicle scheduling method provided by embodiments of the present disclosure is described as an example below.

Taking autonomous parking as an example, single vehicle control may be adopted (i.e., an owner of the vehicle initiates an autonomous driving request, the vehicle responds to the autonomous driving request, enters an autonomous driving state, perceives a surrounding environment of the vehicle based on its own sensor, and performs path planning and vehicle driving control in an autonomous parking scene). When a large number of fully autonomous vehicles meet in the parking lot, and spaces among the plurality of vehicles is limited, in fact, the vehicles are difficult to accurately judge each other's behavior and intention like a human driver, and the vehicles will not avoid each other or will avoid each other at the same time, resulting in a local road being blocked, and the traffic efficiency being reduced.

A main reason for the above problem is that, in an autonomous parking scheme controlled by the single vehicle, the vehicle has a limited environmental perception distance, and the vehicle is difficult to predict behaviors and intentions of other vehicles out of the vehicle's perception range in advance, so the vehicle is difficult to make an avoidance action in advance. However, the parking lot has a complex environment, and when a plurality of vehicles encounter with each other and then move, it is easy to cause blockages and affect normal traffic of the parking lot due to insufficient vacated space, a following vehicle and other reasons. The application example may realize collaborative scheduling among the plurality of vehicles in the autonomous parking scene based on the Internet of Things (for example, the same parking lot uses the same broadcast channel to access the plurality of vehicles), which is described in detail below.

Figure 3:
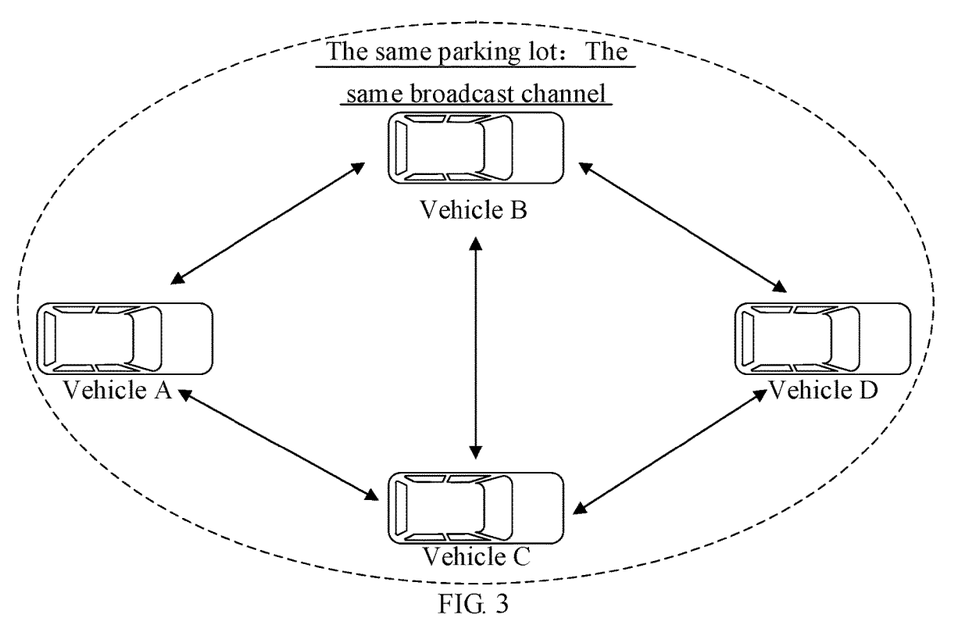
FIG. 3 is a schematic diagram of broadcast communication between a plurality of vehicles, which is realized on the same broadcast channel, in an application example according to embodiments of the present disclosure.

FIG. 3 is a schematic diagram of broadcast communication between a plurality of vehicles, which is realized on the same broadcast channel, in an application example according to embodiments of the present disclosure. As shown in FIG. 3, a vehicle A, a vehicle B, a vehicle C and a vehicle D access to the same broadcast channel in the same parking lot or on the same floor of the same parking lot by using the Internet of Things technology, and send the broadcast message carrying the vehicle state (the vehicle state of the vehicle itself and the vehicle states of other vehicles except for the vehicle) based on the broadcast channel, so as to know the vehicle state of the vehicle itself and the other vehicles except the vehicle, thereby making a common arbitration decision. The vehicle state may be vehicle position/posture/speed/gear of the vehicle itself and the other vehicles except the vehicle. In addition to this basic information, the vehicle state may also include other additional information, such as perception information which may be perceived by the vehicle and the other vehicles except the vehicle (such as an obstacle around the vehicle), and the user behaviors and intentions of the vehicle itself and other vehicles except the vehicle (for example, planning route/local control), etc.

In the same message broadcast channel, all the vehicles may report their own vehicle states, perception information, user behaviors and intentions, and receive the vehicle states, the perception information, the user behaviors and the intentions reported by the other vehicles in the same parking lot based on the broadcast channel. All the vehicles make the common decision through a collaborative arbitration mechanism, in other words, the mutual influences among the vehicles may be judged in advance and the common decision may be made before the untimely avoidance occurs, so that some vehicles may avoid in advance and prevent making temporary decisions in the case of encountering, which will affect the traffic efficiency. The followings are mainly included.

1. When an automatic driving vehicle is driving in or out of the parking lot, it automatically accesses an automatic driving message broadcast channel in an area of the parking lot according to the parking lot identification, a setting rule of the automatic driving message broadcast channel may be set according to a city, a province/city/county, etc.
2. The automated driving vehicle broadcasts its own vehicle state (e.g., vehicle position/posture/speed/gear, etc.), perception information (e.g. the obstacle around the vehicle), behavior and intention (e.g., planning route/local control) and receives reported data from other vehicles in the parking lot at the same time.

It should be noted that the authentication mechanism may be enabled when the automatic driving message broadcast channel being accessed. Each autonomous vehicle may download the security certificate, and then send the authentication request message to the background server in the cloud platform based on the security certificate to request access to the broadcast service of the broadcast channel. In other words, if the vehicle wants to access the current parking lot, it is allowed to access the broadcast service only after the identity of the vehicle is identified to be legal.

It should be noted that before accessing the automatic driving message broadcast channel, it is also necessary to determine which parking lot the vehicle is closest to, determine the parking lot, and obtain the parking lot identification, and then the vehicle accesses the corresponding automatic driving message broadcast channel according to the parking lot identification. Specifically, the vehicle itself has a positioning function, that is, the vehicle may communicate with the background server of the cloud platform, and the vehicle may report its real-time location through the positioning function, or the background server of the cloud platform may actively know the real-time location of the vehicle through the positioning function. For example, the background server of the cloud platform knows whether the vehicle is in the parking lot and which parking lot the vehicle is closest to. A kind of the positioning function is a positioning function based on GPS positioning. The positioning function based on GPS positioning may realize large-scale positioning, but accuracy is not enough. The positioning function based on GPS positioning is preliminary positioning, which may generally find a parking lot near the vehicle (such as a target location "parking lot" within 1 km). Another kind of the positioning function is a positioning function based on high-precision map positioning. The positioning function based on the high-precision map positioning is more accurate, for example, map data matching is carried out between a high-precision map and a currently collected vehicle image, as long as the vehicle is close to an exit/entrance of the parking lot, the high-precision map may successfully position the vehicle, achieve short-range positioning accuracy of 10 cm, 15 cm, etc. In other words, through the map data matching between the high-precision map and the currently collected vehicle image, it is obtained that the vehicle is in the target location "parking lot" on the high-precision map. Then, one or more parking lots closest to the current vehicle may be locked. After the target location "parking lot" is determined, the corresponding parking lot identification is clear. Therefore, the corresponding automatic driving message broadcast channel may be accessed according to the parking lot identification.

3. After all the vehicles in the parking lot obtain the information of the other vehicles and make decisions, they will judge whether there is any conflict which needs to be avoided among the intentions of the vehicles. If there is, they will jointly make the avoidance decision through automatic artificial intelligence arbitration and a voting mechanism among the vehicles (i.e., the cloud platform implements the artificial intelligence arbitration and the voting among the vehicles through a pre-trained arbitration model).

It should be noted that avoidance scenes include a case where a vehicle will affect a straightly driving vehicle while the vehicle is driving out of the current parking space, so it is obviously necessary to avoid; a case where a vehicle is driving out of the current parking space while another vehicle is parking at a side of the vehicle, and it is obviously necessary to avoid; a case where vehicles cannot see each other in a passage between upper and lower floors under a cross-floor situation due to multiple floors of the parking lot, and the vehicles will brake urgently when they meet at an intersection. If the communication based on the above broadcast channel cannot be established, it is uncertain whether the other vehicle will go first or the vehicle will go first. Through the communication based on the broadcast channel, at least planning route, speed, gear and other information are known for the collaborative arbitration, so as to jointly make the avoidance decision.

4. Relevant vehicles automatically implement the avoidance decision according to the collaborative arbitration, for example, a vehicle parking in a parking space waits for a breadthwise driving vehicle to pass, a vehicle pulls over to allow an oncoming vehicle unable to reverse to pass first, etc.

5. After a conflicting vehicle passes through, the collaborative arbitration is continued according to a situation in the parking lot, so as to jointly make the avoidance decision (for example, continuing to avoid, or ending the avoidance and resume the automatic driving).

Figure 4:
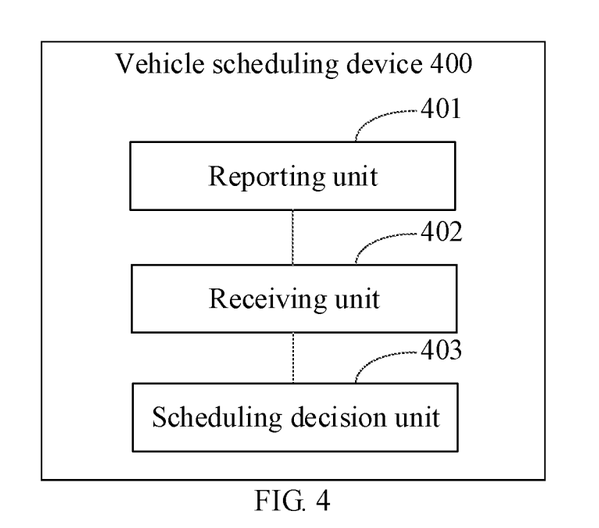
FIG. 4 is a structural diagram of a vehicle scheduling device according to embodiments of the present disclosure.

According to embodiments of the present disclosure, a vehicle scheduling device is provided, FIG. 4 is a structural diagram of a vehicle scheduling device according to embodiments of the present disclosure. As shown in FIG. 4, the vehicle scheduling device 400 includes: a reporting unit 401 configured to cause a first vehicle to report, based on a first broadcast channel, a first vehicle state; a receiving unit 402 configured to cause the first vehicle to receive a second vehicle state reported by a second vehicle based on the first broadcast channel, the second vehicle being a vehicle other than the first vehicle in the same parking lot; and a scheduling decision unit 403 configured to cause the first vehicle to obtain a scheduling decision result for avoidance between the first vehicle and the second vehicle, according to the first vehicle state and the second vehicle state.

In one implementation, the reporting unit is configured to cause the first vehicle to access, according to a parking lot identification of the same parking lot, the first broadcast channel corresponding to the parking lot identification, and send a broadcast message through the first broadcast channel corresponding to the parking lot identification, the broadcast message carrying the first vehicle state.

In one implementation, the scheduling decision unit is configured to cause the first vehicle to obtain, according to the first vehicle state and the second vehicle state, the scheduling decision result, by actively changing the first vehicle's own behavior; and send, based on the first broadcast channel, the scheduling decision result to the second vehicle.

In one implementation, the scheduling decision unit is configured to cause the first vehicle to continue maintaining, according to the first vehicle state and the second vehicle state, the first vehicle's own behavior, generate a notification message, and send, based on the first broadcast channel, the notification message to the second vehicle; cause the first vehicle to monitor, based on the first broadcast channel, feedback of the second vehicle; and cause the first vehicle to receive, based on the first broadcast channel, the scheduling decision result, in the case where the second vehicle obtains the scheduling decision result by actively changing the second vehicle's own behavior based on the notification message.

In one implementation, the scheduling decision unit is configured to cause the first vehicle to continue maintaining, according to the first vehicle state and the second vehicle state, the first vehicle's own behavior, generate a notification message, and send, based on the first broadcast channel, the notification message to the second vehicle; and cause the first vehicle to receive, based on the first broadcast channel, the scheduling decision result made by a cloud platform, in the case where the second vehicle continues maintaining the second vehicle's own behavior based on the notification message and the second vehicle's own behavior conflicts with the first vehicle's own behavior. The scheduling decision result made by the cloud platform is obtained according to a priority of the first and second vehicles in a current conflict scene.

In one implementation, the first vehicle state includes information for characterizing a basic state of the first vehicle, surrounding environment information capable of being perceived by the first vehicle, and a behavior which the first vehicle intends to perform. The second vehicle state includes information for characterizing a basic state of the second vehicle, surrounding environment information capable of being perceived by the second vehicle, and a behavior which the second vehicle intends to perform.

In one implementation, the device further includes an authentication unit configured to cause the first vehicle to initiate an authentication request message to request the cloud platform to provide a broadcast service for the first broadcast channel, and cause the first vehicle to use the first broadcast service after authorization, in the case where the first vehicle receives an authentication success response message.

According to embodiments of the present disclosure, a vehicle scheduling device is provided, the vehicle scheduling device includes: a state reporting unit configured to cause a plurality of vehicles in the same parking lot to establish communication among the plurality of vehicles through the same broadcast channel and report their respective vehicle states; a decision-making unit configured to arbitrate according to the respective vehicle states to achieve a common decision and obtain the scheduling decision result for avoidance among the plurality of vehicles; and a scheduling unit configured to execute an avoidance operation according to the scheduling decision result.

In one implementation, the state reporting unit is configured to access the broadcast channel corresponding to the parking lot identification according to the parking lot identification of the same parking lot, send broadcast messages through the broadcast channel corresponding to the parking lot identification, the broadcast messages carrying the respective vehicle states.

In one implementation, the respective vehicle states include a first state for characterizing information of a vehicle itself and a second state for characterizing information of other vehicles except for the vehicle.

In one implementation, the respective vehicle states also include: the surrounding environment information perceived by the plurality of vehicles and the user behaviors each of the plurality of vehicles wants to perform.

In one implementation, the decision-making unit is configured to cause the plurality of vehicles to make a prejudgment before untimely avoidance of the plurality of vehicles occurs according to the respective vehicle states, obtain an arbitration result under mutual influences of the user behaviors to be performed by the plurality of vehicles, and make the common decision according to the arbitration result to obtain the scheduling decision result for the avoidance among the plurality of vehicles.

In one implementation, the device further includes an authentication unit configured to cause the plurality of vehicles to initiate authentication request messages to request the cloud platform to provide a broadcast service for the broadcast channel, and cause the plurality of vehicles to be authorized to use the broadcast service when receiving authentication success response messages.

In the technical solution of the present disclosure, the acquisition, storage and application of the user's personal information involved are all in compliance with the provisions of relevant laws and regulations, and do not violate public order and good customs.

According to embodiments of the present disclosure, the present disclosure also provides an electronic equipment, a readable storage medium and a computer program product.

Figure 5:
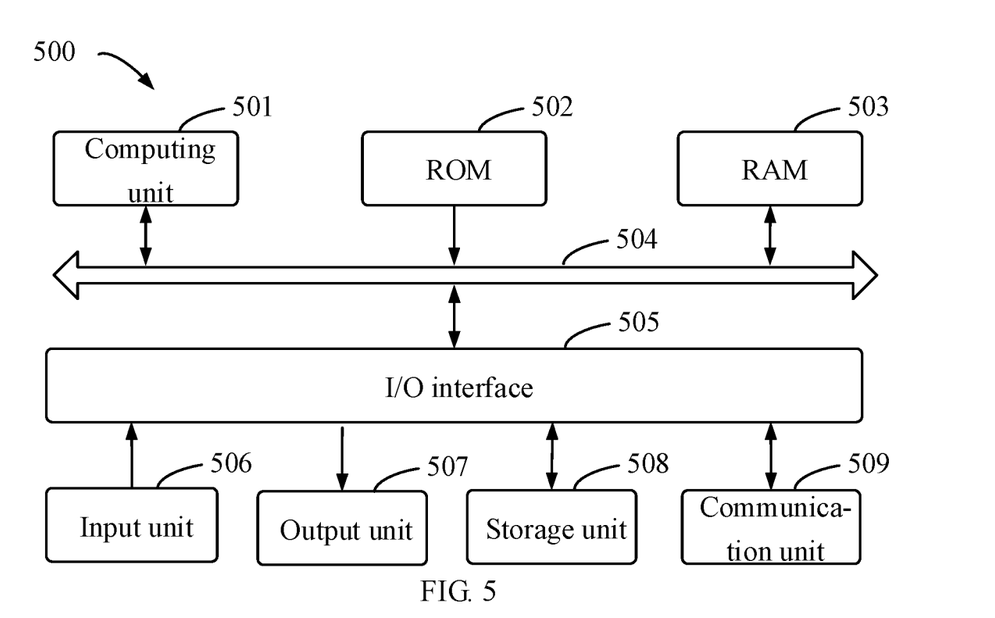
FIG. 5 is a block diagram of an electronic equipment for implementing a vehicle scheduling method according to embodiments of the present disclosure.

FIG. 5 shows a schematic block diagram of an example electronic equipment 500 that may be used to implement embodiments of the present disclosure. The Electronic equipment is intended to represent various forms of digital computers, such as a laptop, a desktop, a workstation, a personal digital assistant, a server, a blade server, a mainframe computer, and other suitable computers. The electronic equipment may also represent various forms of mobile devices, such as a personal digital processing device, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 5, the electronic equipment 500 includes a computing unit 501 which may perform various appropriate actions and processes according to a computer program stored in a read only memory (ROM) 502 or a computer program loaded from a storage unit 508 into a random access memory (RAM) 503. In the RAM 503, various programs and data required for an operation of the equipment 500 may also be stored. The computing unit 501, the ROM 502 and the RAM 503 are connected to each other through a bus 504. An input/output (I/O) interface 505 is also connected to the bus 504.

A plurality of components in the equipment 500 are connected to the I/O interface 505, which include an input unit 506, such as a keyboard, a mouse, and the like; an output unit 507, such as various types of displays, speakers, and the like; the storage unit 508, such as a magnetic disk, an optical disk, or the like; and a communication unit 509, such as a network card, a modem, a wireless communication transceiver, and the like. The communication unit 509 allows the equipment 500 to exchange information/data with other devices through a computer network such as the Internet and/or various telecommunication networks.

The computing unit 501 may be various general-purpose and/or special-purpose processing components with processing and computing capabilities. Some examples of the computing unit 501 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 501 performs various methods and processes described above, such as the vehicle scheduling method. For example, in some implementations, the vehicle scheduling method may be implemented as a computer software program which is tangibly contained in a machine-readable medium, such as the storage unit 508. In some implementations, part or all of the computer program may be loaded and/or installed on the equipment 500 via the ROM 502 and/or the communication unit 509. When a computer program is loaded into the RAM 503 and executed by the computing unit 501, one or more steps of the vehicle scheduling method described above may be performed. Alternatively, in other implementations, the computing unit 501 may be configured to perform the vehicle scheduling method by any other suitable means (e.g., by means of firmware).

Various implementations of the systems and techniques described above herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), computer hardware, firmware, software, and/or a combination thereof. These various implementations may include being implemented in one or more computer programs which may be executed and/or interpreted on a programmable system including at least one programmable processor, the programmable processor may be a special-purpose or general-purpose programmable processor, may receive data and instructions from a storage system, at least one input device, and at least one output device, and transmit data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer or other programmable data processing device, so that when executed by the processor or the controller, the program codes enable the functions/operations specified in the flowchart and/or block diagram to be implemented. The program codes may be executed completely on a machine, partially executed on the machine, partially executed on the machine and partially executed on a remote machine as separate software packages, or completely executed on the remote machine or a server.

In the context of the present disclosure, a machine-readable medium may be a tangible medium that may contain or store a program for use by or in combination with an instruction execution system, device, or equipment. The machine-readable medium may be a machine-readable signal medium or a machine-readable storage medium. The machine-readable medium may include, but are not limited to, electronic, magnetic, optical, electromagnetic, infrared, or semiconductor systems, devices, or equipment, or any suitable combination of thereof. More specific examples of the machine-readable storage medium may include an electrical connection based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of thereof.

In order to provide interaction with a user, the systems and technologies described herein may be implemented on a computer that has: a display apparatus for displaying information to the user (e.g., a cathode ray tube (CRT) or a liquid crystal display (LCD) monitor)); and a keyboard and a pointing device (e.g., a mouse or a trackball) through which the user may provide input to the computer. Other types of devices may also be used to provide the interaction with the user. For example, feedback provided to the user may be any form of sensory feedback (e.g., visual feedback, auditory feedback, or tactile feedback); and it is capable of receiving the input from the user in any form (including acoustic input, voice input, or tactile input).

The systems and technologies described herein may be implemented in a computing system that includes a back-end component (e.g., a data server), a computing system that includes a middleware component (e.g., an application server), a computing system that includes a front-end component (e.g., a user computer with a graphical user interface or a web browser through which the user may interact with the implementation of the systems and technologies described herein), or a computing system that includes any combination of the back-end component, the middleware component, or the front-end component. The components of the system may be connected to each other through any form or kind of digital data communication (e.g., a communication network). Examples of the communication network include a local area network (LAN), a wide area network (WAN), and the Internet.

A computer system may include a client and a server. The client and server are generally far away from each other and usually interact through a communication network. A relationship between the client and the server is generated through computer programs performed on a corresponding computer and having a client-server relationship with each other. The server may be a cloud server, a server of a distributed system, or a server combined with a block chain.

It should be understood that various forms of the processes shown above may be used to reorder, add or delete steps. For example, the steps described in the present disclosure may be executed in parallel, sequentially, or in a different order, as long as the desired result of the technical solution disclosed in the present disclosure may be achieved, and this is not limited herein.

The foregoing specific implementations do not constitute a limitation on the protection scope of the present disclosure. Those of ordinary skill in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A vehicle scheduling method, applied to a plurality of vehicles in an autonomous parking scene based on an Internet of Things, comprising:

initiating, by a first vehicle among the plurality of vehicles, an authentication request message carrying a security certificate to request a cloud platform to provide a broadcast service, wherein the first vehicle downloads the security certificate in advance;

accessing, by the first vehicle, according to a parking lot identification of a parking lot, a first broadcast channel corresponding to the parking lot identification, in a case of the first vehicle receives an authentication success response message, wherein there is a one-to-one mapping relationship between the parking lot identification and the first broadcast channel;

sending, by the first vehicle, a broadcast message through the first broadcast channel, wherein the broadcast message carries a first vehicle state, and the first vehicle state includes information for characterizing a basic state of the first vehicle, surrounding environment information perceived by the first vehicle, and a planned route of the first vehicle;

receiving, by the first vehicle, a second vehicle state reported by a second vehicle among the plurality of vehicles through the first broadcast channel, wherein the second vehicle is a vehicle other than the first vehicle in the same parking lot and is accessed to the first broadcast channel, and the second vehicle state includes information for characterizing a basic state of the second vehicle, surrounding environment information perceived by the second vehicle, and a planned route of the second vehicle;

determining, by the first vehicle, whether a space for maneuvering of the first vehicle and the second vehicle is insufficient, according to the basic state of the first vehicle, the surrounding environment information perceived by the first vehicle, the planned route of the first vehicle, the basic state of the second vehicle, the surrounding environment information perceived by the second vehicle, and the planned route of the second vehicle; and obtaining, by the first vehicle, a scheduling decision result for avoidance between the first vehicle and the second vehicle, in a case of the space for maneuvering of the first vehicle and the second vehicle is insufficient, comprising:
continuing maintaining, by the first vehicle, according to the first vehicle state and the second vehicle state, the first vehicle's own behavior;
generating, by the first vehicle, a notification message;
sending, by the first vehicle, based on the first broadcast channel, the notification message to the second vehicle; and
receiving, by the first vehicle, based on the first broadcast channel, the scheduling decision result made by a cloud platform, in a case of the second vehicle continues maintaining the second vehicle's own behavior based on the notification message and the second vehicle's own behavior conflicts with the first vehicle's own behavior, wherein the scheduling decision result made by the cloud platform is obtained according to a priority of the first and second vehicles in a current conflict scene;
wherein the scheduling decision result comprises: a high-priority vehicle maintains its own user behavior, and a low-priority vehicle changes its own user behavior.

2. The method of claim 1, wherein obtaining, by the first vehicle, the scheduling decision result for the avoidance between the first vehicle and the second vehicle, comprises:
obtaining, by the first vehicle, according to the first vehicle state and the second vehicle state, the scheduling decision result, by actively changing the first vehicle's own behavior; and
sending, based on the first broadcast channel, the scheduling decision result to the second vehicle.

3. The method of claim 1, wherein obtaining, by the first vehicle, the scheduling decision result for the avoidance between the first vehicle and the second vehicle, comprises:
continuing maintaining, by the first vehicle, according to the first vehicle state and the second vehicle state, the first vehicle's own behavior;
generating, by the first vehicle, a notification message;
sending, by the first vehicle, based on the first broadcast channel, the notification message to the second vehicle;
monitoring, by the first vehicle, based on the first broadcast channel, feedback of the second vehicle; and
receiving, by the first vehicle, based on the first broadcast channel, the scheduling decision result, in a case of the second vehicle obtains the scheduling decision result by actively changing the second vehicle's own behavior based on the notification message.

4. An electronic equipment, applied to a first vehicle among a plurality of vehicles in an autonomous parking scene based on an Internet of Things, comprising:
at least one processor; and
a memory communicatively connected to the at least one processor,
wherein the memory stores an instruction executable by the at least one processor, and the instruction is executed by the at least one processor to cause the at least one processor to execute operations comprising:
causing the first vehicle to initiate an authentication request message carrying a security certificate to request a cloud platform to provide a broadcast service, wherein the first vehicle downloads the security certificate in advance;
causing the first vehicle to access, according to a parking lot identification of a parking lot, a first broadcast channel corresponding to the parking lot identification, in a case of the first vehicle receives an authentication success response message, wherein there is a one-to-one mapping relationship between the parking lot identification and the first broadcast channel;
causing the first vehicle to send a broadcast message through the first broadcast channel, wherein the broadcast message carries a first vehicle state, and the first vehicle state includes information for characterizing a basic state of the first vehicle, surrounding environment information perceived by the first vehicle, and a planned route of the first vehicle;
causing the first vehicle to receive a second vehicle state reported by a second vehicle among the plurality of vehicles through the first broadcast channel, wherein the second vehicle is a vehicle other than the first vehicle in the same parking lot and is accessed to the first broadcast channel, and the second vehicle state includes information for characterizing a basic state of the second vehicle, surrounding environment information perceived by the second vehicle, and a planned route of the second vehicle;
causing the first vehicle to determine whether a space for maneuvering of the first vehicle and the second vehicle is insufficient, according to the basic state of the first vehicle, the surrounding environment information perceived by the first vehicle, the planned route of the first vehicle, the basic state of the second vehicle, the surrounding environment information perceived by the second vehicle, and the planned route of the second vehicle; and
causing the first vehicle to obtain a scheduling decision result for avoidance between the first vehicle and the second vehicle, in a case of the space for maneuvering of the first vehicle and the second vehicle is insufficient, comprising:
causing the first vehicle to continue maintaining, according to the first vehicle state and the second vehicle state, the first vehicle's own behavior;
causing the first vehicle to generate a notification message;
causing the first vehicle to send, based on the first broadcast channel, the notification message to the second vehicle; and
causing the first vehicle to receive, based on the first broadcast channel, the scheduling decision result made by a cloud platform, in a case of the second vehicle continues maintaining the second vehicle's own behavior based on the notification message and the second vehicle's own behavior conflicts with the first vehicle's own behavior, wherein the scheduling decision result made by the cloud platform is obtained according to a priority of the first and second vehicles in a current conflict scene;
wherein the scheduling decision result comprises: a high-priority vehicle maintains its own user behavior, and a low-priority vehicle changes its own user behavior.

5. The electronic equipment of claim 4, wherein the operations comprise:
causing the first vehicle to obtain, according to the first vehicle state and the second vehicle state, the scheduling decision result, by actively changing the first vehicle's own behavior; and
causing the first vehicle to send, based on the first broadcast channel, the scheduling decision result to the second vehicle.

6. The electronic equipment of claim 4, wherein the operations comprise:
    causing the first vehicle to continue maintaining, according to the first vehicle state and the second vehicle state, the first vehicle's own behavior;
    causing the first vehicle to generate a notification message;
    causing the first vehicle to send, based on the first broadcast channel, the notification message to the second vehicle;
    causing the first vehicle to monitor, based on the first broadcast channel, feedback of the second vehicle; and
    causing the first vehicle to receive, based on the first broadcast channel, the scheduling decision result, in a case of the second vehicle obtains the scheduling decision result by actively changing the second vehicle's own behavior based on the notification message.

7. A non-transitory computer-readable storage medium storing a computer instruction thereon, applied to a first vehicle among a plurality of vehicles in an autonomous parking scene based on an Internet of Things, wherein the computer instruction is used to cause a computer to execute a method comprising:
    causing the first vehicle to initiate an authentication request message carrying a security certificate to request a cloud platform to provide a broadcast service, wherein the first vehicle downloads the security certificate in advance;
    causing the first vehicle to access, according to a parking lot identification of a parking lot, a first broadcast channel corresponding to the parking lot identification, in a case of the first vehicle receives an authentication success response message, wherein there is a one-to-one mapping relationship between the parking lot identification and the first broadcast channel;
    causing the first vehicle to send a broadcast message through the first broadcast channel, wherein the broadcast message carries a first vehicle state, and the first vehicle state includes information for characterizing a basic state of the first vehicle, surrounding environment information perceived by the first vehicle, and a planned route of the first vehicle;
    causing the first vehicle to receive a second vehicle state reported by a second vehicle among the plurality of vehicles through the first broadcast channel, wherein the second vehicle is a vehicle other than the first vehicle in the same parking lot and is accessed to the first broadcast channel, and the second vehicle state includes information for characterizing a basic state of the second vehicle, surrounding environment information perceived by the second vehicle, and a planned route of the second vehicle;
    causing the first vehicle to determine whether a space for maneuvering of the first vehicle and the second vehicle is insufficient, according to the basic state of the first vehicle, the surrounding environment information perceived by the first vehicle, the planned route of the first vehicle, the basic state of the second vehicle, the surrounding environment information perceived by the second vehicle, and the planned route of the second vehicle; and
    causing the first vehicle to obtain a scheduling decision result for avoidance between the first vehicle and the second vehicle, in a case of the space for maneuvering of the first vehicle and the second vehicle is insufficient, comprising:
        causing the first vehicle to continue maintaining, according to the first vehicle state and the second vehicle state, the first vehicle's own behavior;
        causing the first vehicle to generate a notification message;
        causing the first vehicle to send, based on the first broadcast channel, the notification message to the second vehicle; and
        causing the first vehicle to receive, based on the first broadcast channel, the scheduling decision result made by a cloud platform, in a case of the second vehicle continues maintaining the second vehicle's own behavior based on the notification message and the second vehicle's own behavior conflicts with the first vehicle's own behavior, wherein the scheduling decision result made by the cloud platform is obtained according to a priority of the first and second vehicles in a current conflict scene;
    wherein the scheduling decision result comprises: a high-priority vehicle maintains its own user behavior, and a low-priority vehicle changes its own user behavior.

8. The non-transitory computer-readable storage medium of claim 7, wherein the method comprises:
    causing the first vehicle to obtain, according to the first vehicle state and the second vehicle state, the scheduling decision result, by actively changing the first vehicle's own behavior; and
    causing the first vehicle to send, based on the first broadcast channel, the scheduling decision result to the second vehicle.

9. The non-transitory computer-readable storage medium of claim 7, wherein the method comprises:
    causing the first vehicle to continue maintaining, according to the first vehicle state and the second vehicle state, the first vehicle's own behavior;
    causing the first vehicle to generate a notification message;
    causing the first vehicle to send, based on the first broadcast channel, the notification message to the second vehicle;
    causing the first vehicle to monitor, based on the first broadcast channel, feedback of the second vehicle; and
    causing the first vehicle to receive, based on the first broadcast channel, the scheduling decision result, in a case of the second vehicle obtains the scheduling decision result by actively changing the second vehicle's own behavior based on the notification message.

* * * * *